(12) United States Patent
Chang

(10) Patent No.: US 8,280,241 B1
(45) Date of Patent: Oct. 2, 2012

(54) COMBINATION OF COVER WITH HOOD

(76) Inventor: Chung Jen Chang, Taichung (TW)

( * ) Notice: Subject to any disclaimer, the term of this patent is extended or adjusted under 35 U.S.C. 154(b) by 0 days.

(21) Appl. No.: 13/082,930

(22) Filed: Apr. 8, 2011

(51) Int. Cl.
*G03B 11/04* (2006.01)
*G03B 17/00* (2006.01)
*G02B 23/16* (2006.01)
(52) U.S. Cl. .................. 396/534; 396/448; 359/511
(58) Field of Classification Search .................. 396/448, 396/534; 359/228, 511
See application file for complete search history.

(56) References Cited

U.S. PATENT DOCUMENTS

| 2003/0133709 A1* | 7/2003 | Kobayashi et al. | 396/448 |
| 2005/0117900 A1* | 6/2005 | Ohmori et al. | 396/448 |
| 2010/0158503 A1* | 6/2010 | Fujiwara | 396/448 |

\* cited by examiner

*Primary Examiner* — Clayton E Laballe
*Assistant Examiner* — Noam Reisner

(57) ABSTRACT

Disclosed is a hood-cover combination for a lens of a camera. The hood-cover combination includes a hood for detachable attachment to a portion of the camera around the lens, a frame rotationally located in the hood, two covers pivotally connected to the frame and two springs for biasing the covers from the frame so that the frame is kept open.

10 Claims, 14 Drawing Sheets

COMBINATION OF COVER WITH HOOD

BACKGROUND OF INVENTION

1. Field of Invention

The present invention relates to a camera and, more particularly, to a combination of a cover with a hood for a lens of a camera.

2. Related Prior Art

In photography, a camera is often equipped with a cover for covering a lens so that the lens will not be hit or contaminated. However, a photograph cannot be taken without removing the cover from the lens of the camera. This often causes a photographer to miss a good shot when he or she suddenly gets a fleeting glimpse of an object.

The camera is sometimes equipped with a hood for shielding the lens. Thus, the lens will not be wetted and contaminated by rain or splash of water. Moreover, clear photographs can be taken because undesirable light is blocked from the lens.

Conventionally, the cover and the hood are two different elements. The cover cannot be used to protect the lens if the hood is attached to the camera. It is troublesome to replace the hood with the lens camera, and vice versa.

The present invention is therefore intended to obviate or at least alleviate the problems encountered in prior art.

SUMMARY OF INVENTION

It is the primary objective of the present invention to provide a camera with a hood-cover combination.

To achieve the foregoing objective, the hood-cover combination includes a hood for detachable attachment to a portion of the camera around the lens, a frame rotationally located in the hood, two covers pivotally connected to the frame and two springs for biasing the covers from the frame so that the frame is kept open.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
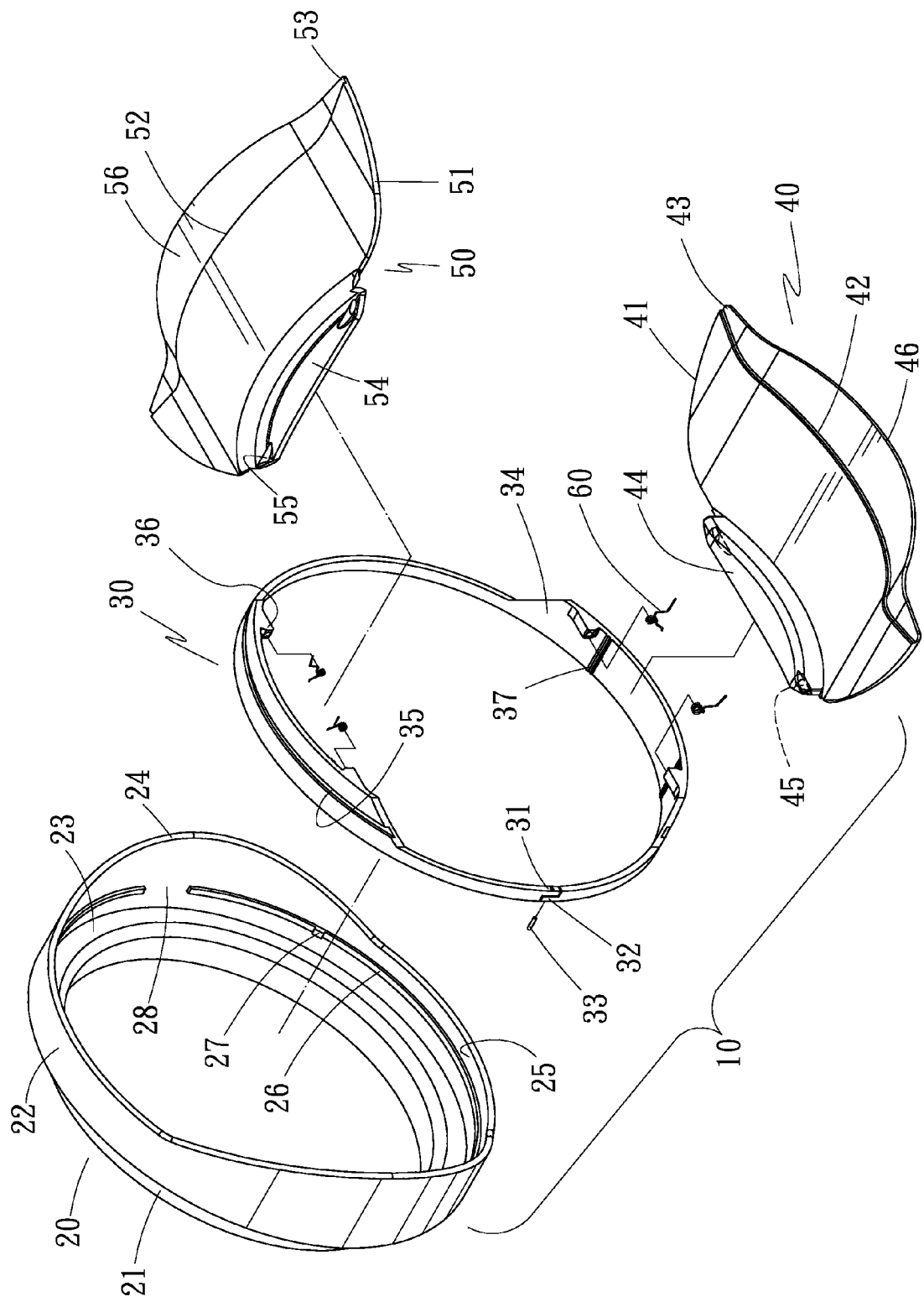
FIG. 1 is an exploded view of a hood-cover combination according to the first embodiment of the present invention.
Figure 2:
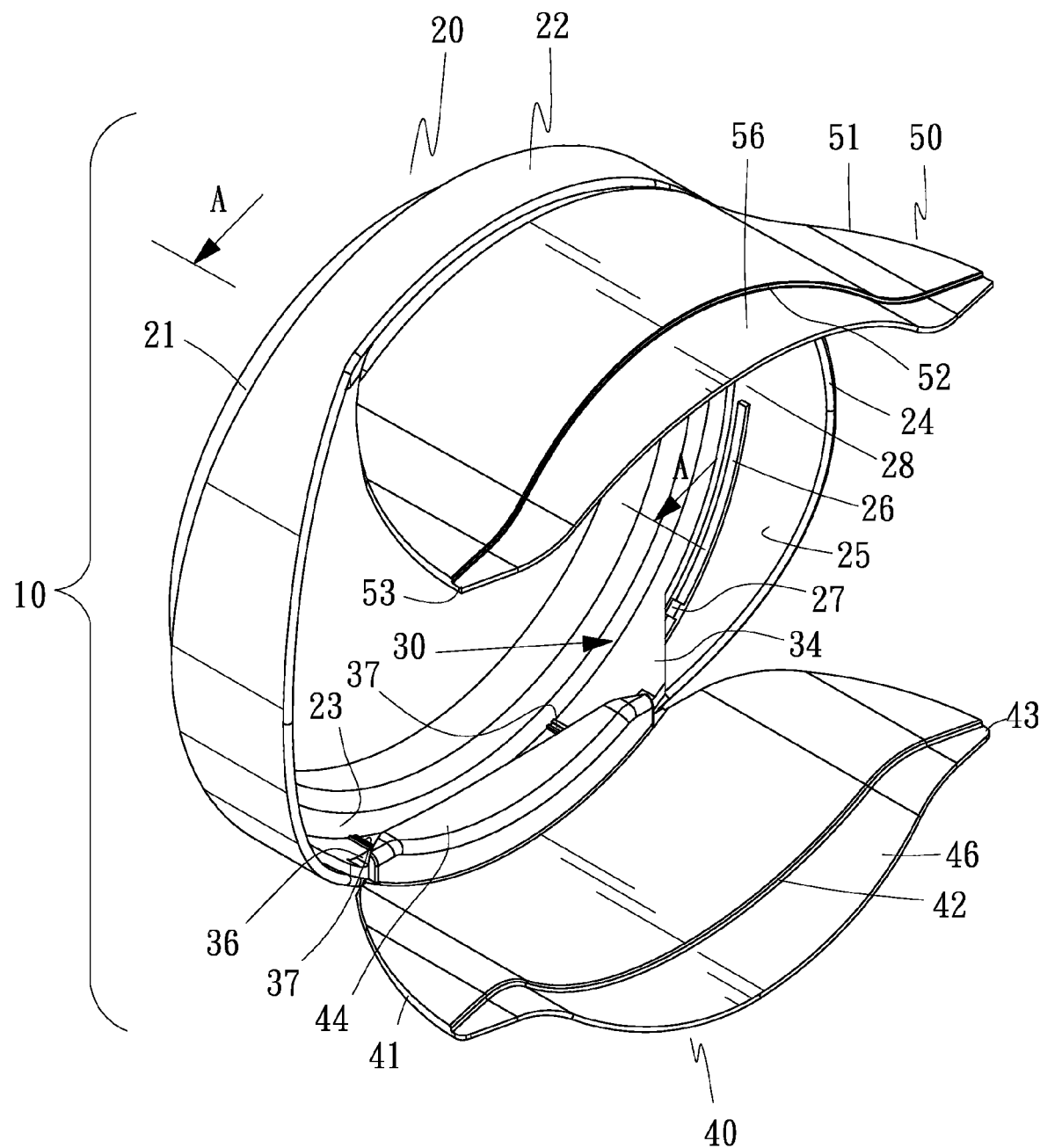
FIG. 2 is an enlarged, perspective view of the hood-cover combination shown in FIG. 1.
Figure 3:
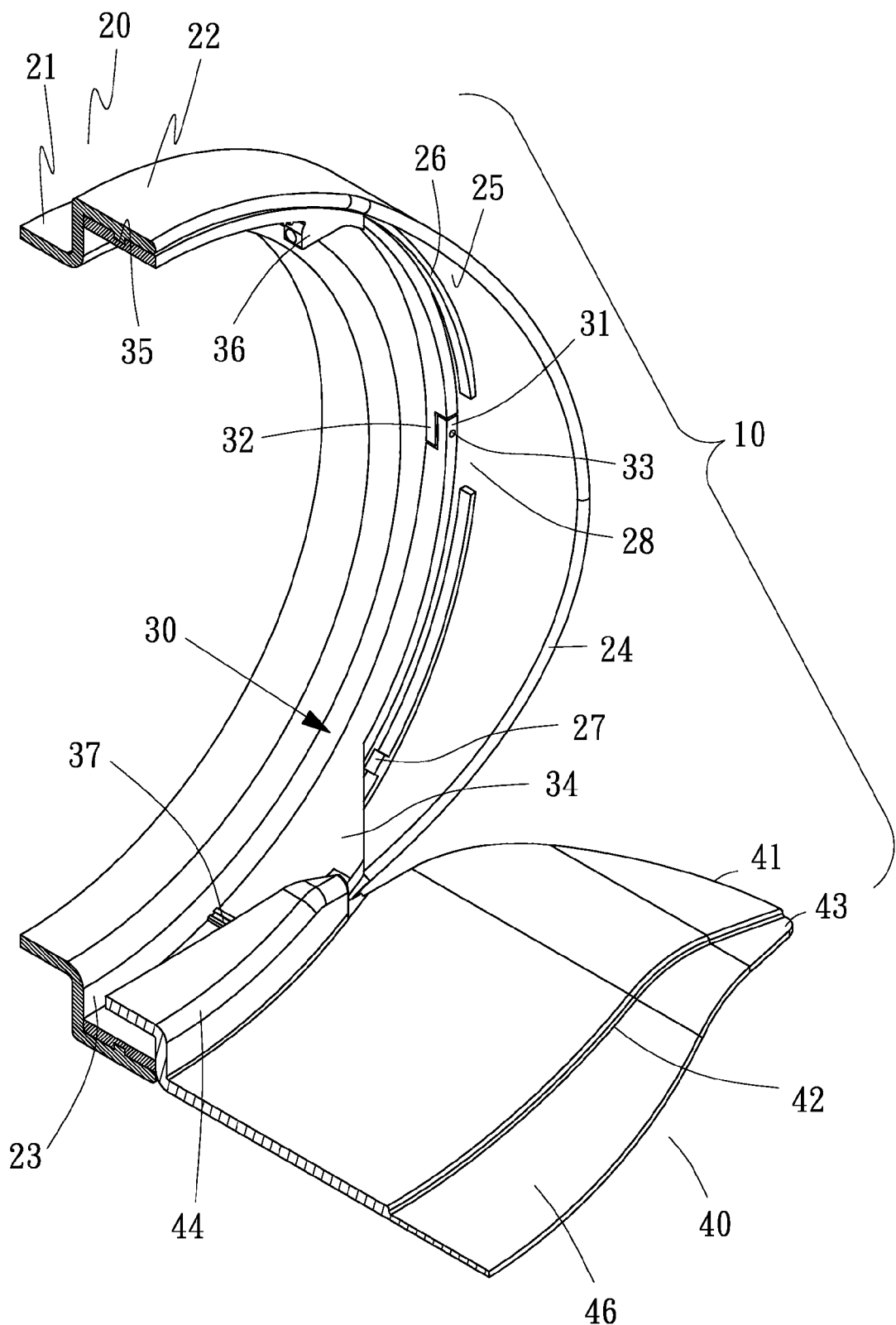
FIG. 3 is a cut-away view of the hood-cover combination shown in FIG. 2.

Referring to FIGS. 1 to 11, there is shown a hood-cover combination 10 according to a first embodiment of the present invention. The hood-cover combination 10 includes a hood 20, a frame 30, a first cover 40, a second cover 50 and four torque springs 60.

The hood 20 is made with an annular configuration. The hood 20 includes a first ring 21, a second ring 22 made with an internal diameter longer than that of the first ring 21, and an annular flange 23 extending between the first ring 21 and the second ring 22. Two separate canopies 24 extend from the second ring 22. There are two tracks 26 extending on an internal side 25 of the second ring 22. The tracks 26 are separated from each other by two gaps 28. Hence, each of the tracks 26 extends for less than 180°. Each of the tracks 26 includes a stop 27 formed thereon.

The frame 30 is made with an annular configuration. The frame 30 is actually a C-shaped element formed with a first reduced end 31 and a second reduced end 32. The reduced ends 31 and 32 of the frame 30 are shaped in compliance with each other. The reduced ends 31 and 32 of the frame 30 are normally separated from each other by a gap, i.e., the frame 30 is normally in an expanded position. Two separate extensive portions 34 axially extend from the frame 30. An arched groove 35 is defined in an external side of each of the extensive portions 34 of the frame 30. Two lugs 36 are formed on an internal side of each of the extensive portions 34 of the frame 30. Each of the extensive portions 34 of the frame 30 includes two axial grooves 37 defined in the internal side so that the axial grooves 37 are located between the lugs 36.

The first cover 40 includes two arched edges 41, a pivot 44 extending along an edge extending between the arched edges 41, an edge 42 formed opposite to the pivot 44, and a reduced lip 46 extending from the edge 42. That is, each of the arched edges 41 is located between the pivot 44 and the reduced lip 46. The pivot 44 is formed with two opposite reduced ends 45. A tip 43 is formed between each of the arched edges 41 and the reduced lip 46. A rectilinear distance between the tips 43 is shorter than the internal diameter of the second ring 22 but longer than the diameter of a circle defined by the tracks 26.

The second cover 50 includes two arched edges 51, a pivot 54 extending along an edge extending between the arched edges 51, an edge 52 formed opposite to the pivot 54, and a reduced lip 56 extending from the edge 52. That is, each of the arched edges 51 is located between the pivot 54 and the reduced lip 56. The pivot 54 is formed with two opposite reduced ends 55. The reduced lip 56 is shaped in compliance with the reduced lip 46. A tip 53 is formed between each of the arched edges 51 and the reduced lip 56. A rectilinear distance between the tips 53 is shorter than the internal diameter of the second ring 22 but longer than the diameter of a circle defined by the tracks 26.

Each of the torque springs 60 includes a helical middle section and two ends 61 and 62 extending from the helical middle section. A tunnel is defined by the helical middle section of each of the torque springs 60.

In assembly, each of the reduced ends 45 of the pivot 44 is inserted in a bore defined in a related one of the lugs 36, thus pivotally connecting the first cover 40 to the frame 30. Each reduced end 45 of the pivot 44 is inserted in the related lug 36 after it is inserted through the tunnel defined by the helical middle section of a related one of the torque springs 60. The end 61 of each of the torque springs 60 related to the pivot 44 is located in a related one of the axial grooves 37 while the other end 62 of the torque spring 60 is located against the first cover 40. Thus, the first cover 40 tends to be pivoted from the frame 30 because of the related torque springs 60.

Similarly, each of the reduced ends 55 of the pivot 54 is inserted in a bore defined in a related one of the lugs 36, thus pivotally connecting the second cover 50 to the frame 30. Each reduced end 55 of the pivot 54 is inserted in the related lug 36 after it is inserted through the tunnel defined by the helical middle section of a related one of the torque springs 60. One of the ends of each of the torque springs 60 related to the pivot 54 is located in a related one of the axial grooves 37 while the other end of the torque spring 60 is located against the second cover 50. Thus, the second cover 50 tends to be pivoted from the frame 30 because of the related torque springs 60.

The frame 30 is shrunk, i.e., the reduced ends 31 and 32 of the frame 30 are located against each other. Thus, the frame 30 can be located in the second ring 22, against the annular flange 23. Then, the reduced ends 31 and 32 of the frame 30 are released from each other, i.e., the frame 30 is expanded so that the tracks 27 are movably located in the arched grooves 35. After the reduced ends 31 and 32 of the frame 30 are located in one of the gaps 28, a pin 33 is inserted in an aperture defined in each of the reduced ends 31 and 32 of the frame 30 so that the frame 30 is kept expanded and connected to the hood 20. Now, the frame 30 looks like a perfect ring as the reduced ends 31 and 32 of the frame 30 are shaped in compliance with each other.

Figure 4:
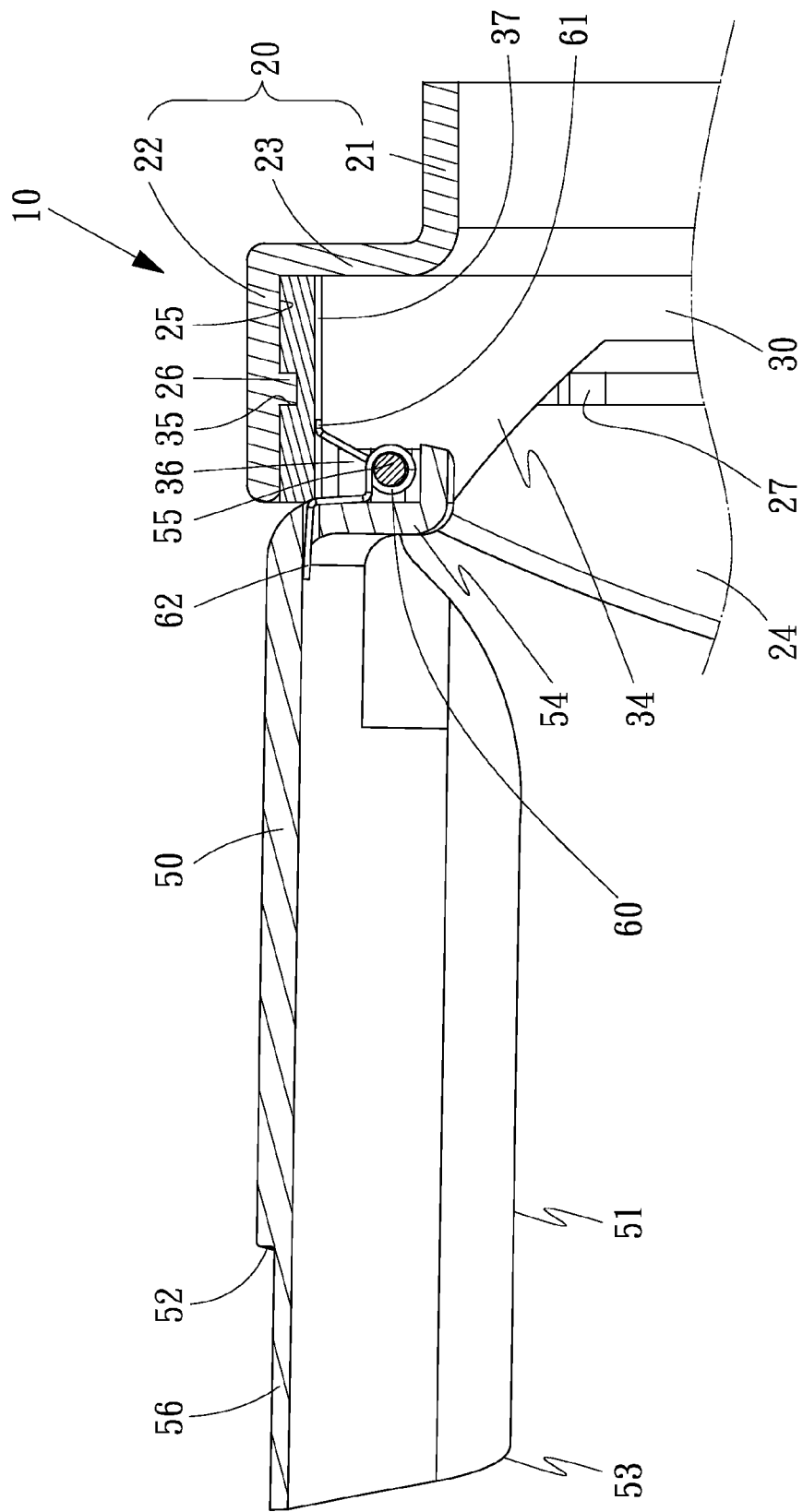
FIG. 4 is an enlarged, partial, cross-sectional view of the hood-cover combination taken along a line A-A shown in FIG. 2.

In operation, referring to FIG. 4, the covers 40 and 50 are pivoted from the frame 30 because of the related torque springs 60. That is, the frame 30 is kept open.

Figure 5:
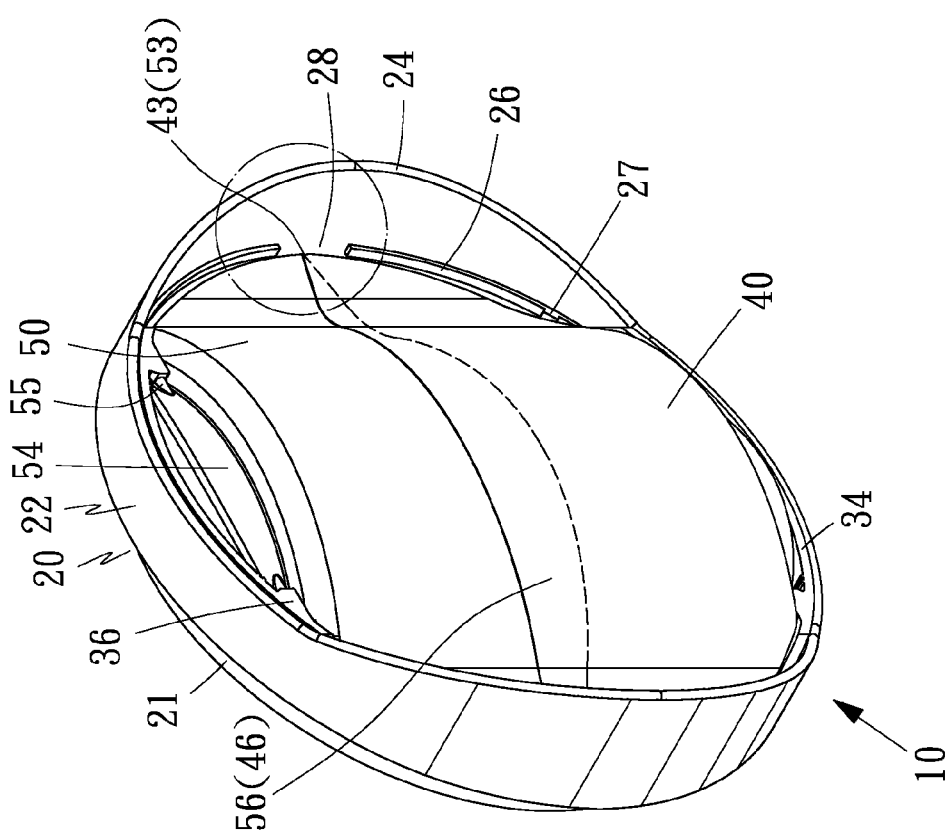
FIG. 5 is a perspective view of the hood-cover combination in an early phase of a closing operation.
Figure 6:
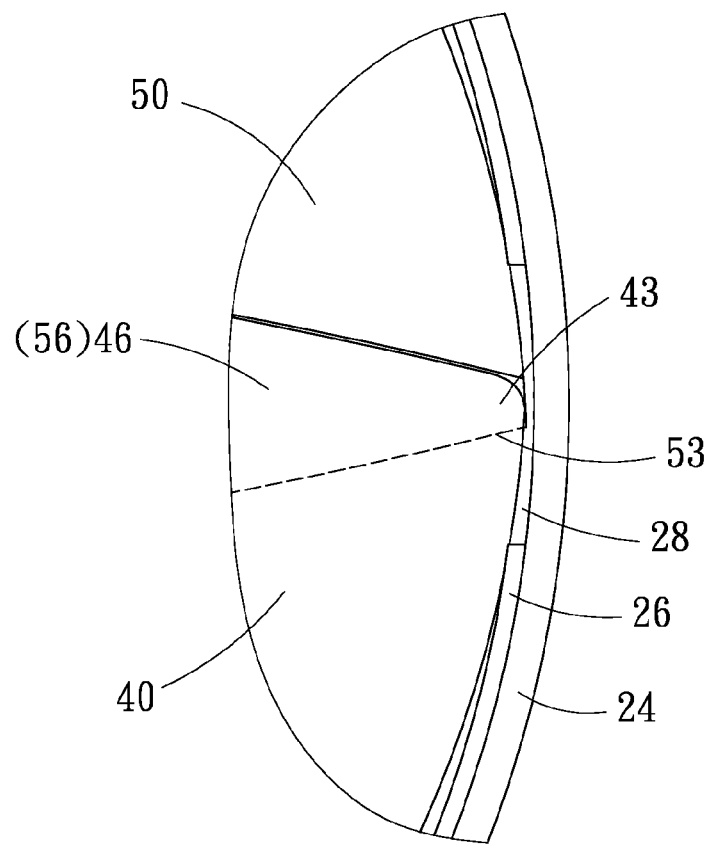
FIG. 6 is an enlarged, partial, front view of the hood-cover combination shown in FIG. 5.

Referring to FIGS. 5 and 6, the covers 40 and 50 are located against the frame 30, i.e., the frame 30 is closed by the covers 40 and 50. The reduced lip 46 is located on the reduced lip 56. The covers 40 and 50 define a smooth surface because the reduced lips 46 and 56 are shaped in compliance with each other. The tips 43 and 53 are located in the gaps 28.

Figure 7:
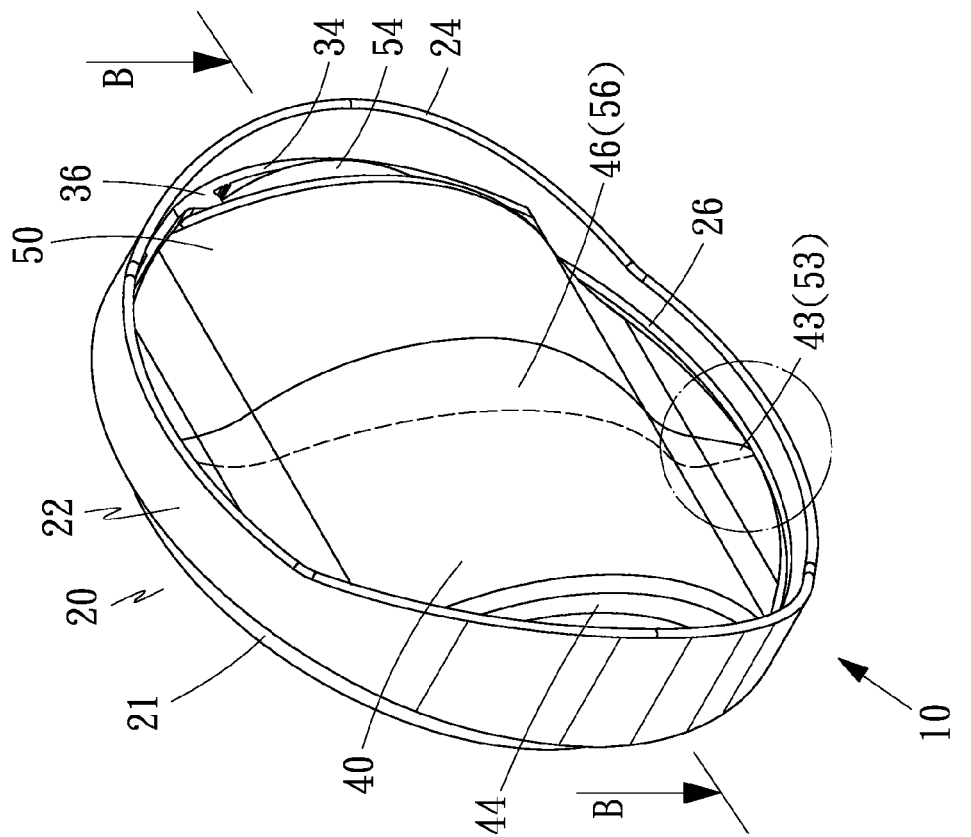
FIG. 7 is a perspective view of the hood-cover combination in a final phase of the closing operation.
Figure 9:
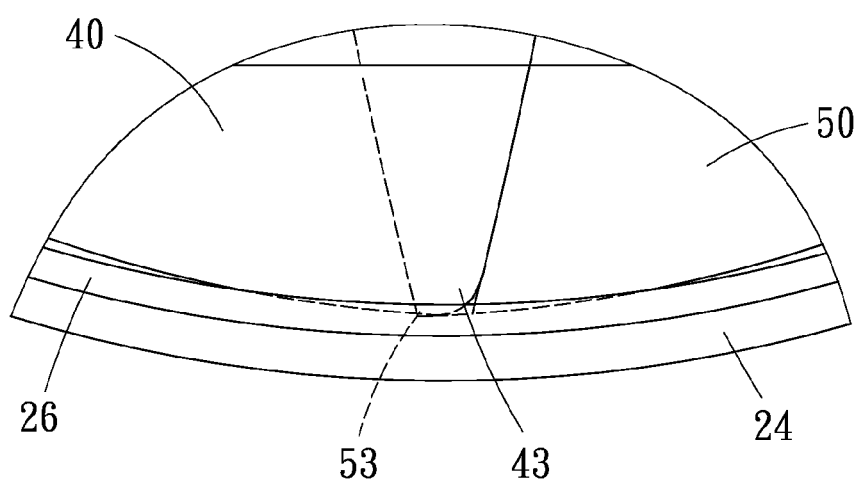
FIG. 9 is an enlarged, partial, front view of the hood-cover combination shown in FIG. 7.
Figure 8:
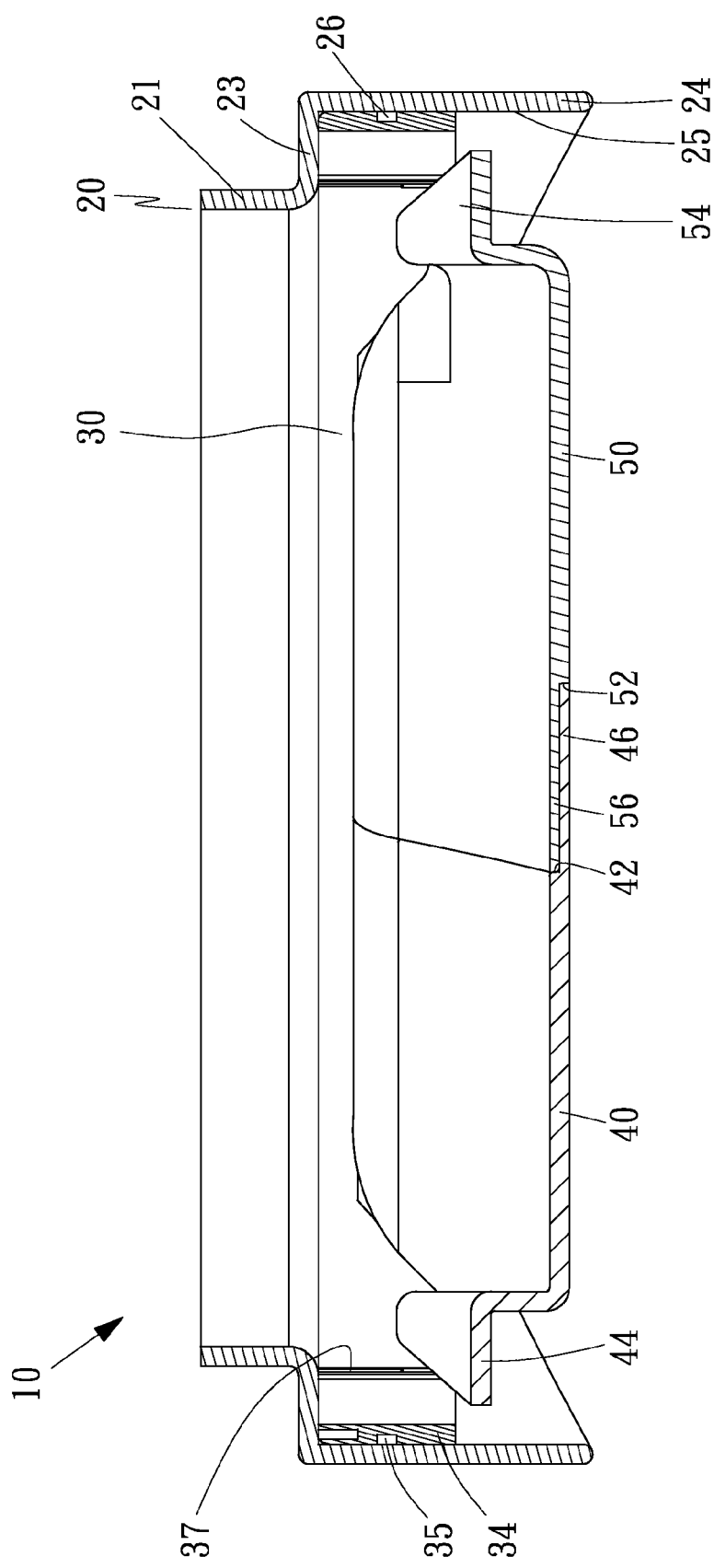
FIG. 8 is an enlarged, cross-sectional view of the hood-cover combination taken along a line B-B shown in FIG. 7.

Referring to FIGS. 7 through 9, the covers 40 and 50 are spun for about an angle of 90° from the position shown in FIGS. 5 and 6. Thus, the tips 43 and 53 are restrained by the tracks 26. Hence, the covers 40 and 50 are retained against the frame 30, i.e., the frame 30 is kept closed by the covers 40 and 50.

Figure 10:
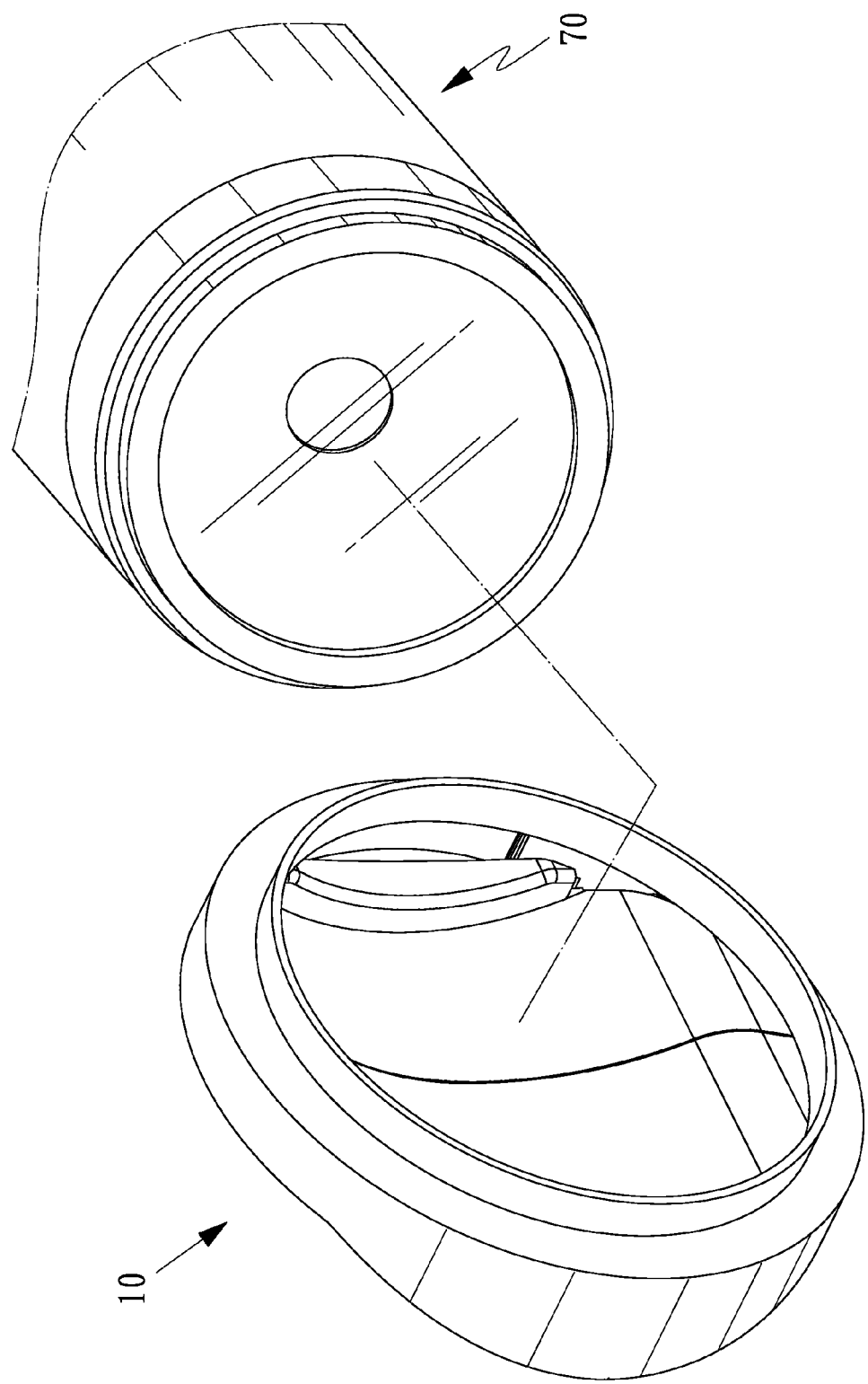
FIG. 10 is a perspective view of a frame for a lens of a video camera and the hood-cover combination shown in FIG. 2.
Figure 11:
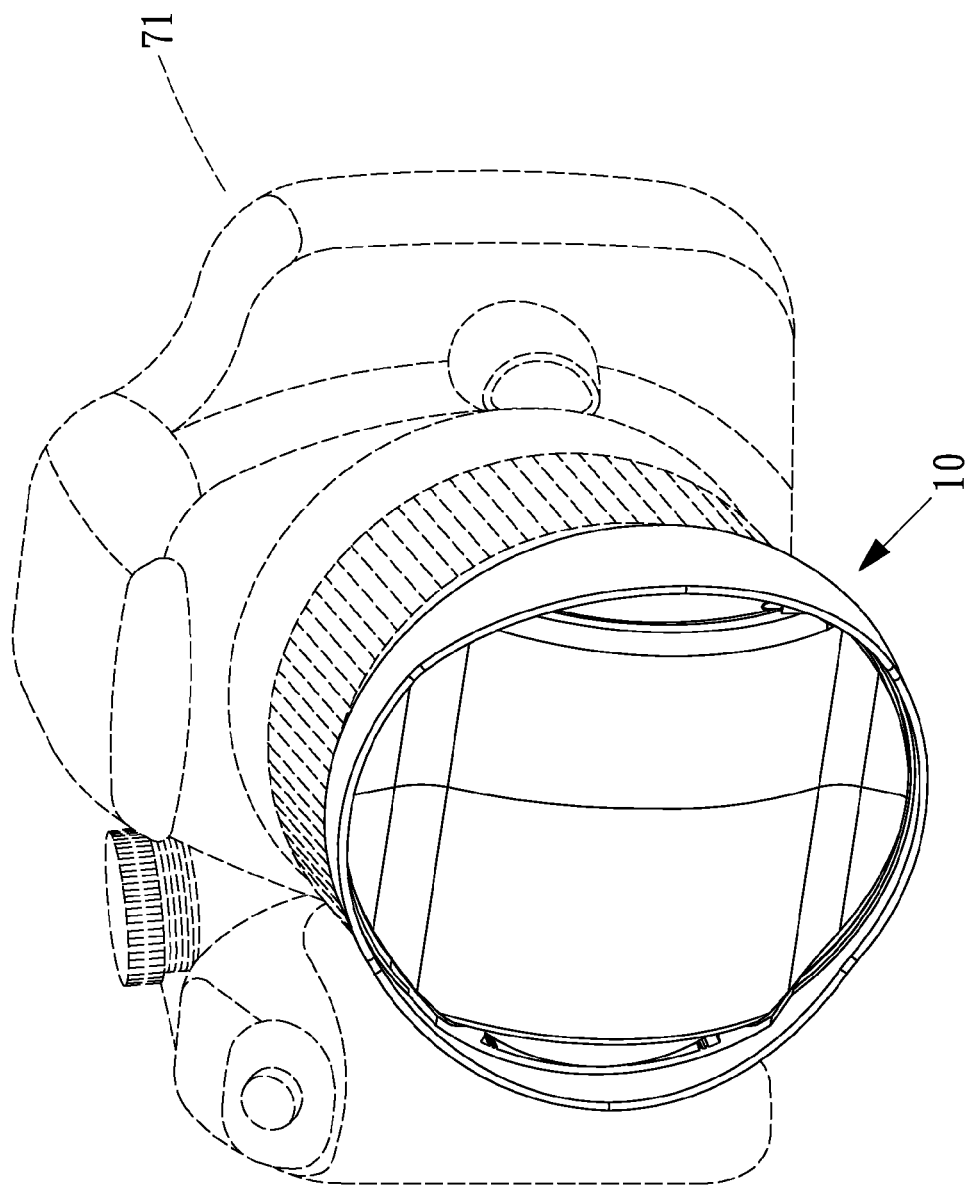
FIG. 11 is a perspective view of a camera and the hood-cover combination shown in FIG. 2.
Figure 12:
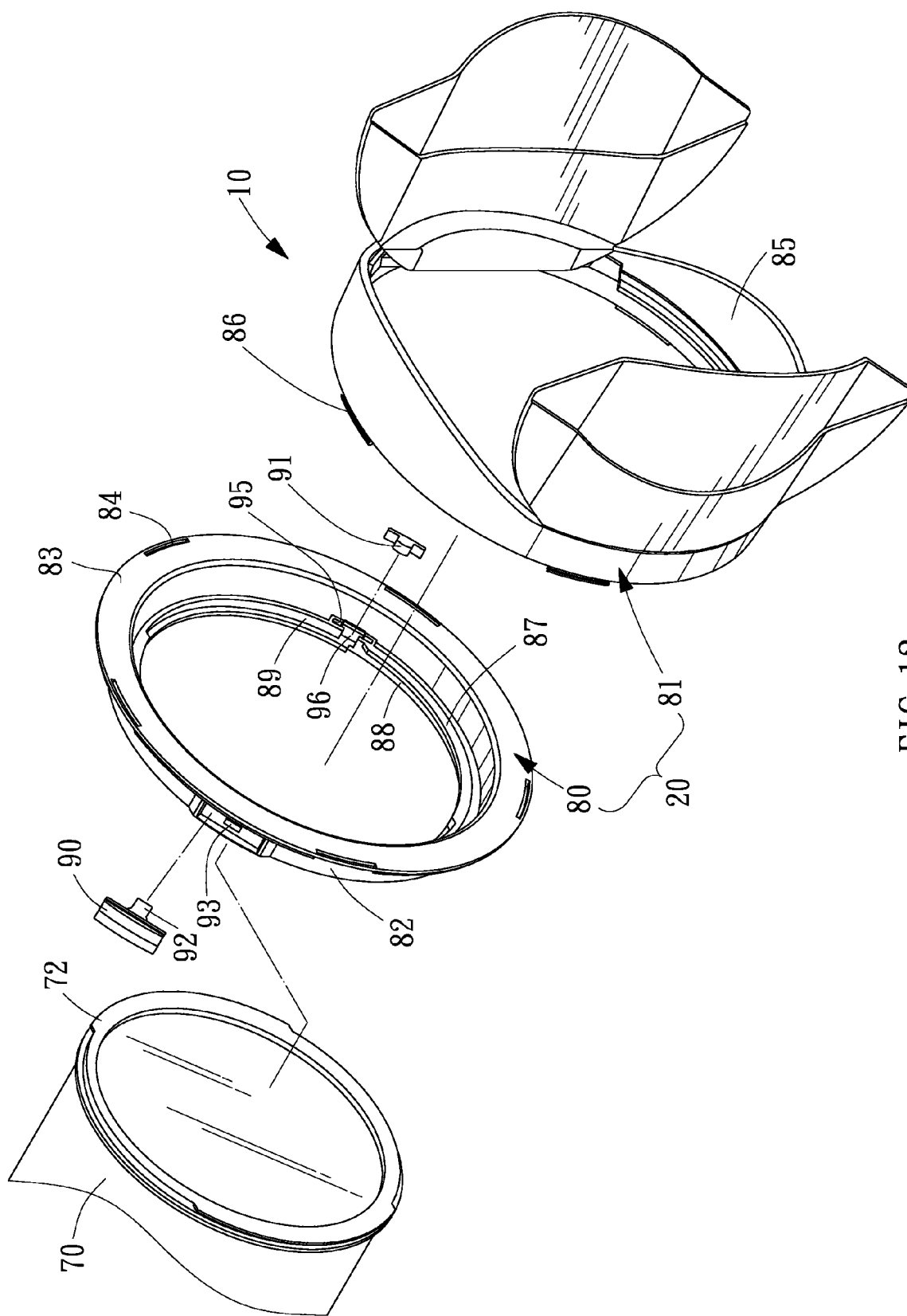
FIG. 12 is an exploded view of a hood-cover combination according to the second embodiment of the present invention.
Figure 13:
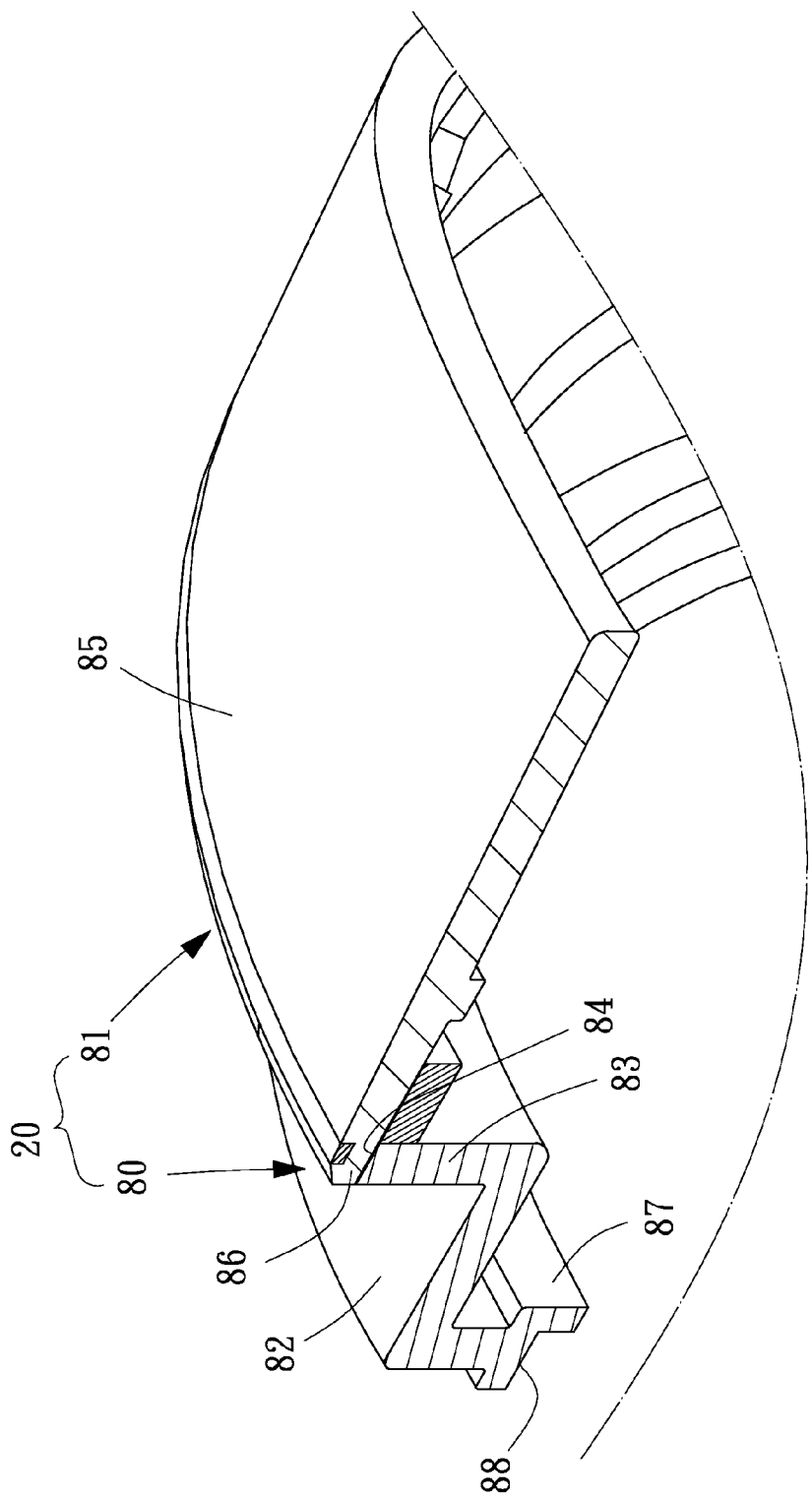
FIG. 13 is an enlarged, partial, cut-away view of the hood-cover combination shown in FIG. 12.
Figure 14:
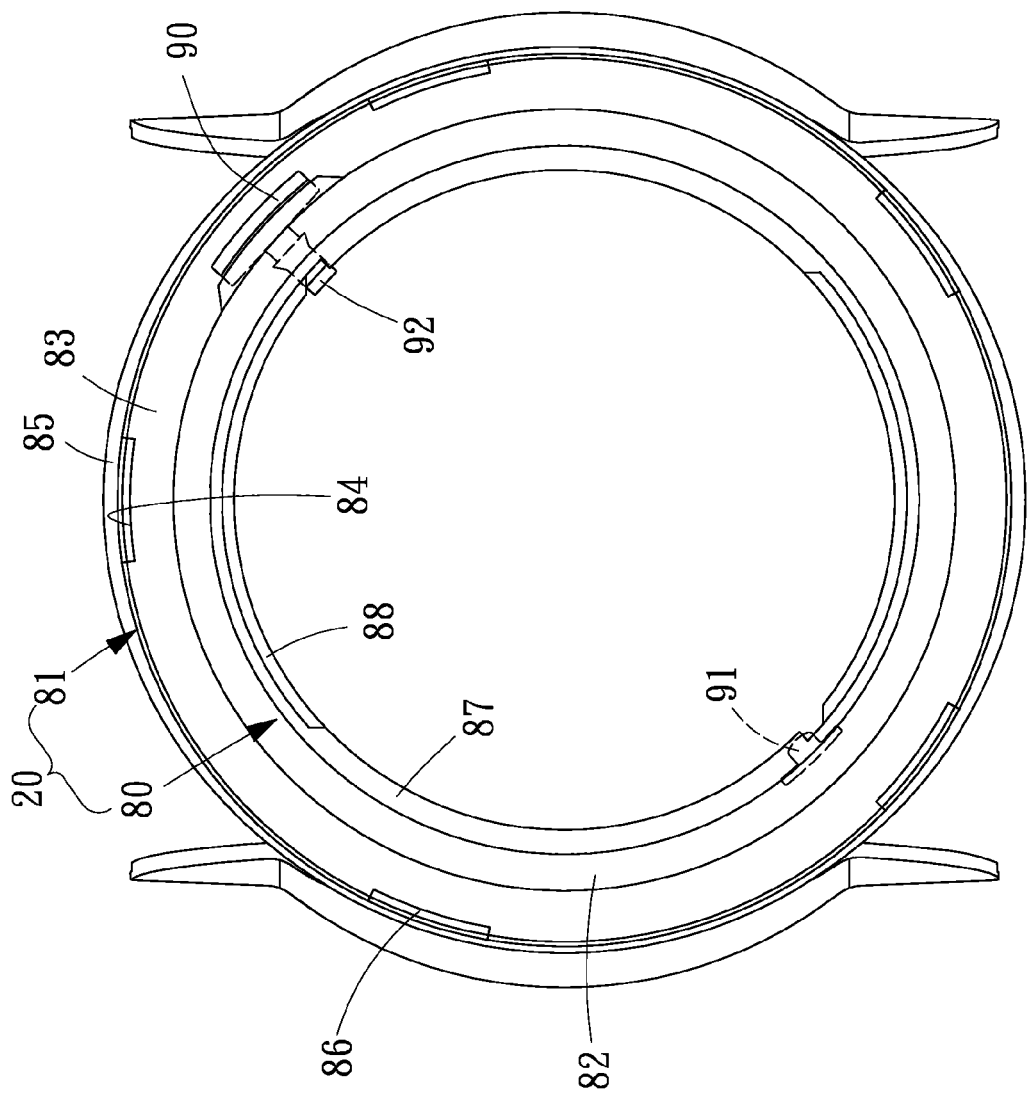
FIG. 14 is a front view of the hood-cover combination of FIG. 12.
Figure 15:
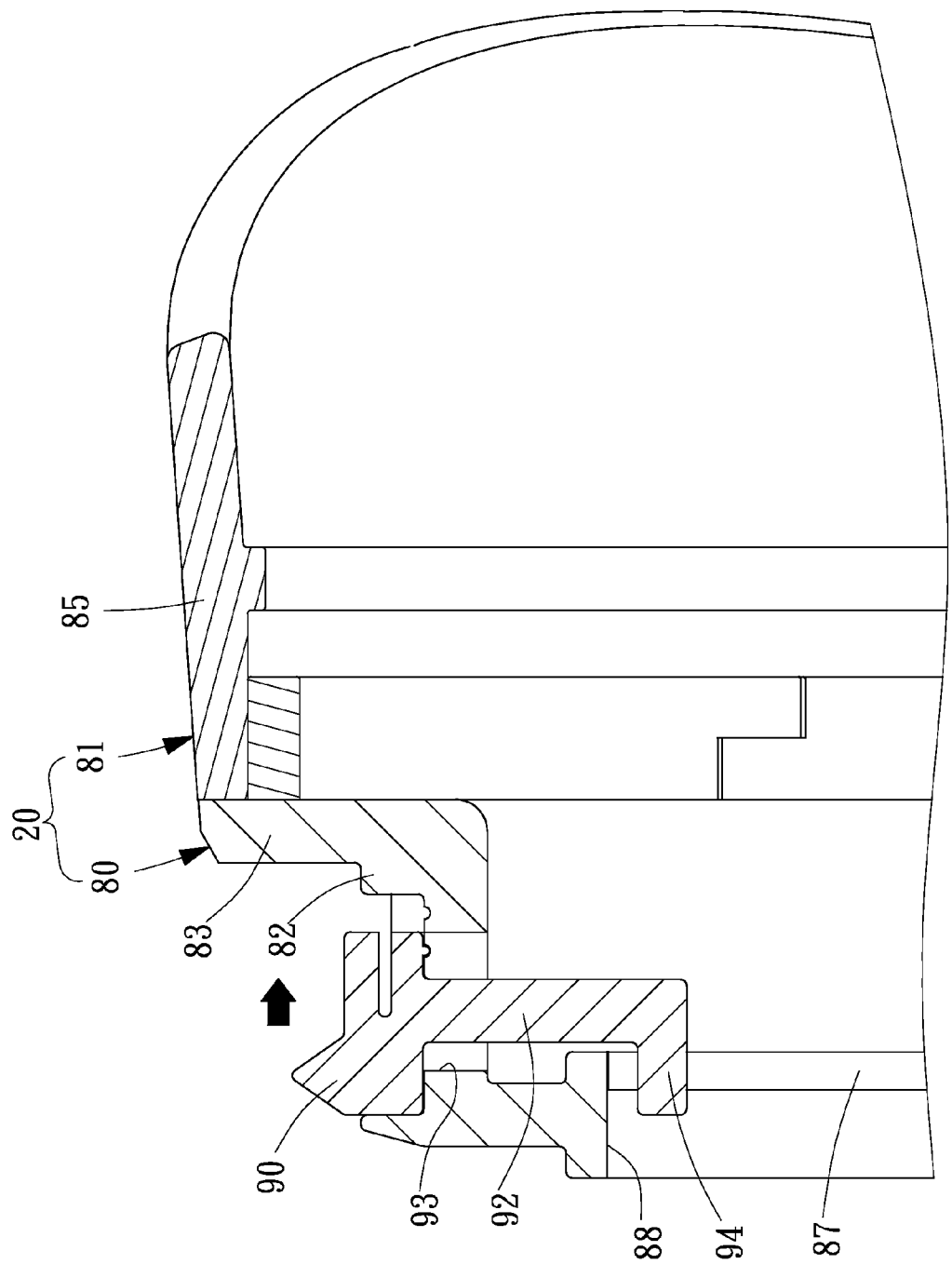
FIG. 15 is an enlarged, partial, cross-sectional view of the hood-cover combination shown in FIG. 12.
Figure 16:
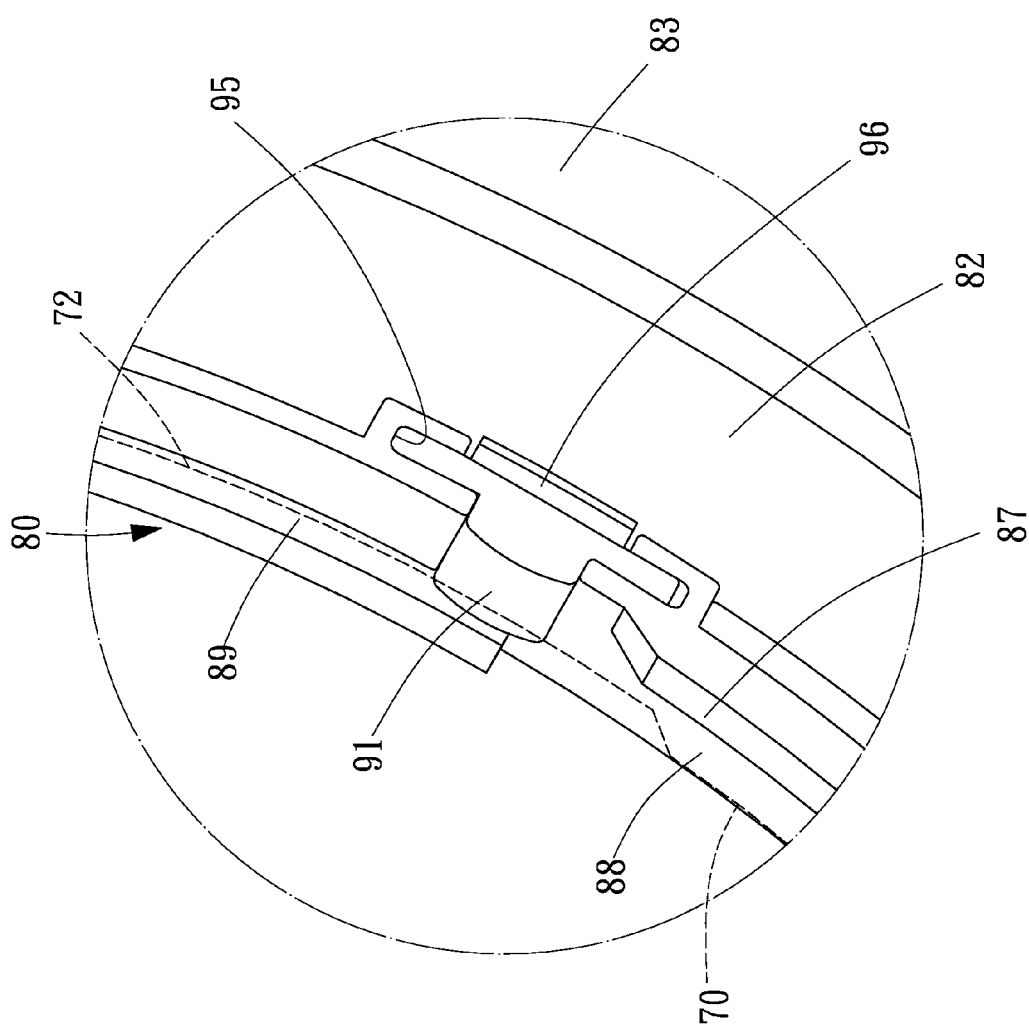
FIG. 16 is an enlarged, partial, perspective view of the hood-cover combination shown in FIG. 12.

The hood-cover combination 10 can be used with a video camera 70 shown in FIG. 10. Alternatively, the hood-cover combination 10 can be used with a camera 71 shown in FIG. 11.

Referring to FIGS. 12 to 16, there is shown a hood-cover combination 10 according to a second embodiment of the present invention. The second embodiment is like the first embodiment except that the hood 20 includes two annular elements 80 and 81 that are made separately and then joined together. The annular element 80 is formed with a ring 82 like the first ring 21 and an annular flange 83 like the annular flange 23. The annular flange 83 however includes apertures 84 defined therein.

The annular element 81 is like the second ring 22 except formed with hooks 86. In assembly, the hooks 86 are inserted through the apertures 84 by force, thus connecting the annular element 81 to the annular element 80. The annular element 81 includes two canopies 85 like the canopies 24.

The annular element 80 includes further features for connection to the video camera 70 formed with two separate arched flanges 72. The annular element 80 includes two separate threads 87 each extending along a section of a helix and including a rear side 88 and a front side 89.

In operation, the threads 87 are engaged with the arched flanges 72, i.e., each of the arched flanges 72 is located between the rear side 88 of one of the threads 87 and the front side 89 of the other thread 87. Thus, the annular element 80 is connected to the frame of the lens of the video camera 70.

The second embodiment further includes a switch 90 and a pusher 91. The switch 90 includes a slide, a key 92 perpendicularly extending from the slide, and a barb 94 perpendicularly extending from the key 92. The key 92 is inserted in a slot 93 axially defined in the ring 82. The slot 93 is located in a gap between the arched threads 87. The key 92 is kept in the slot 93 because of the barb 94.

The key 92 is movable along the slot 93 between a locking position and a releasing position. In the locking position, the key 92 restrains one of the arched flanges 72, thus preventing the hood 20 from spin relative to the frame of the lens of the video camera 70 so that the hood 20 is kept connected to the frame of the lens of the video camera 70. In the releasing position, the key 92 releases the arched flange 72, thus allowing the hood 20 to spin relative to the frame of the lens of the video camera 70 so that the hood 20 can be detached from the frame of the lens of the video camera 70.

The pusher 91 includes a strip and a block perpendicularly extending from the strip. The block of the pusher 91 located in another gap between the arched threads 87. The strip of the pusher 91 is located in a recess 95 defined in an internal side of the ring 82 and restrained by a tab 96 formed on the internal side of the ring 82 so that the pusher 91 is kept connected to the ring 82. The block of the pusher 91 is located against one of the arched flanges 72, thus keeping the annular element 80 firmly against the frame of the lens of the video camera 70.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:
1. A hood-cover combination including:
a hood including a first ring for detachable attachment to a portion of a camera around a lens, a second ring made with an internal diameter longer than that of the first ring, an annular flange formed between the first and second rings, two tracks extending on an internal side of the second ring, and two gaps defined between the tracks;
a frame including two extensive portions each including an arched groove defined in an external side for movably receiving the tracks and two lugs formed on an internal side;
two covers each including a pivot with two reduced ends inserted in the lugs of a respective one of the extensive portions of the frame; and two springs for biasing the covers from the frame so that the frame is kept open.

2. The hood-cover combination according to claim 1, wherein the first ring and the annular flange are made in one piece while the second ring is made as another piece connected to the annular flange.

3. The hood-cover combination according to claim 2, wherein the annular flange includes apertures defined therein, wherein the second ring includes hooks inserted through the apertures by force.

4. The hood-cover combination according to claim 1, wherein the first and second rings and the annular flange are made in one piece.

5. The hood-cover combination according to claim 1, wherein the second ring includes two separate canopies formed thereon.

6. The hood-cover combination according to claim 1, including torque springs each provided on a related one of the reduced ends of a related one of the pivots.

7. The hood-cover combination according to claim 1, wherein each of the covers includes a lip formed thereon opposite to the pivot, two arched edges extending between the lip and the pivot, and two tips each formed between a related one of the arched edges and the lip, wherein the distance between the tips is smaller than an internal diameter of the second ring so that the covers can be located in the second ring when they are pivoted to the frame.

8. The hood-cover combination according to claim 7, wherein the distance between the tips is shorter than a diameter of a circle defined by the tracks so that the tips can be restrained by the tracks, thus keeping the frame closed by the covers.

9. The hood-cover combination according to claim 7, wherein the lips are overlapped when the frame is closed by the covers.

10. The hood-cover combination according to claim 9, wherein the lips are made of reduced thickness so that they are in flush with the covers when the covers are overlapped.

* * * * *